W. A. BARNETT.

COLLAR TURNING MACHINE.

APPLICATION FILED MAR. 19 1919.

Reissued Feb. 22, 1921. 15,046.

2 SHEETS—SHEET 1.

Witnesses.
Arthur H. Carlson
Robert H. Weir

Inventor.
William A. Barnett.
by Zabel + Mueller
Attys.

W. A. BARNETT.

COLLAR TURNING MACHINE.

APPLICATION FILED MAR. 19, 1919.

Reissued Feb. 22, 1921.

15,046.

2 SHEETS—SHEET 2.

Witnesses:

Arthur W. Carlson

Robert H. Weir

Inventor:

William A. Barnett by Gabel & Mueller

Attys.

UNITED STATES PATENT OFFICE.

WILLIAM A. BARNETT, OF LINCOLN, NEBRASKA.

COLLAR-TURNING MACHINE.

15,046. Specification of Reissued Letters Patent. Reissued Feb. 22, 1921.

Original No. 1,273,807, dated July 30, 1918, Serial No. 167,568, filed May 9, 1917. Application for reissue filed March 19, 1919. Serial No. 283,650.

*To all whom it may concern:*

Be it known that I, WILLIAM A. BARNETT, a citizen of the United States, residing at Lincoln, in the county of Lancaster, State of Nebraska, have invented certain new and useful Improvements in Collar-Turning Machines; and I do hereby declare the following to be a full, clear, and exact description of the invention, such as will enable others skilled in the art to which it appertains to make and use the same.

This invention is an improvement in apparel apparatus and has particular reference to a collar turning machine.

In the manufacture of collars, particularly of the so called "turn-down" type, it is customary to first stitch one of the longitudinal edges and the ends of the several plies of a section of the collar and then reverse or turn the plies inside out so that said longitudinal edges will be positioned between the two innermost plies.

The present invention is designed to facilitate the reversing operation and, to this end, use is made of a stationary collar supporting member upon which the section of the collar, after the same has been stitched, is mounted and which has associated therewith a second collar supporting member adjustable to a position contiguous to a portion of the section of the collar on the stationary member, so that by pulling on said section toward said adjustable member said section is drawn over said adjustable member and thereby reversed.

The inventive idea involved is capable of receiving a variety of mechanical expressions, one of which, for the purpose of illustrating the invention, is shown in the accompanying drawing wherein:—

Figure 1:
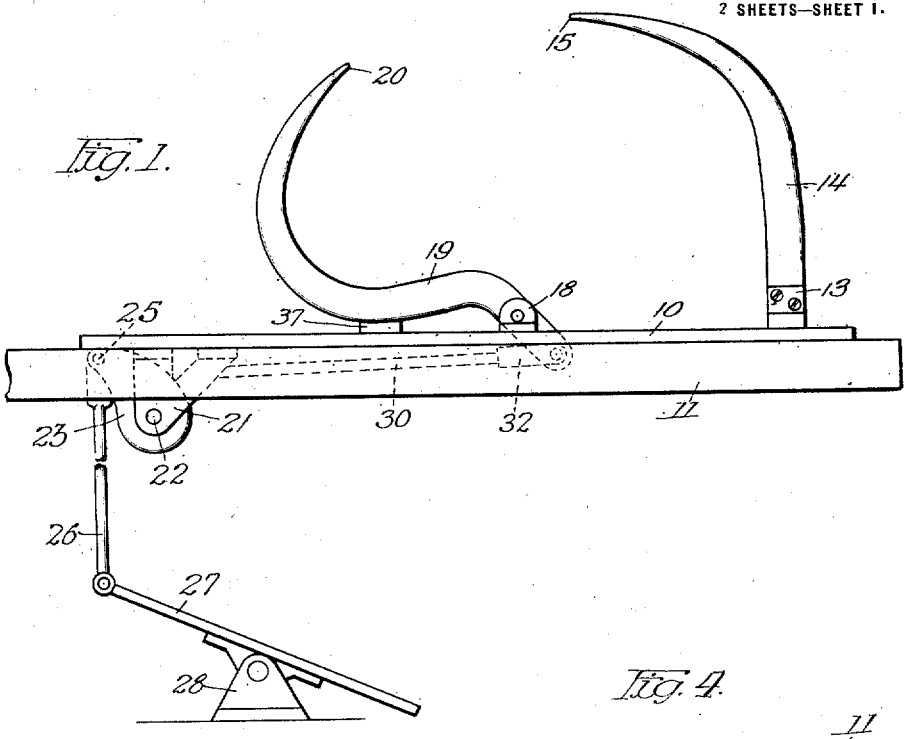
Figure 1 is a side elevation showing the machine attached to a support with the collar supporting members in inoperative position.
Figure 4:
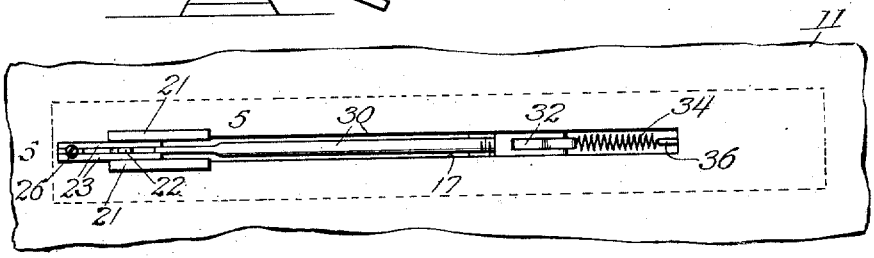
Fig. 4 is a bottom plan view thereof.
Figure 5:
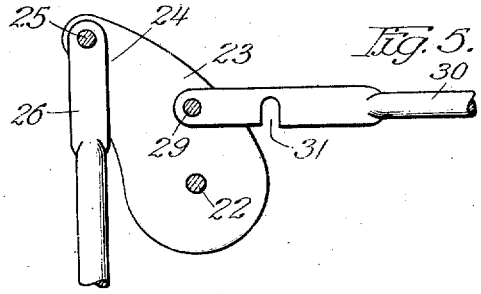
Fig. 5 is a section on the line 5—5 of Fig. 4.

The drawing illustrates what is now believed to be a preferred form of the invention which comprises an elongated rectangular base plate 10, which may be secured to a support 11 by screw fasteners 12. Adjacent one end of the base plate 10 the same has connected thereto oppositely disposed brackets or bearings 13 between which is disposed the lower end of a stationary collar supporting member 14 preferably in the form of an elongated arm curved inwardly toward the opposite end of the base plate and tapered to a point at its free end as indicated at 15.

Figure 2:
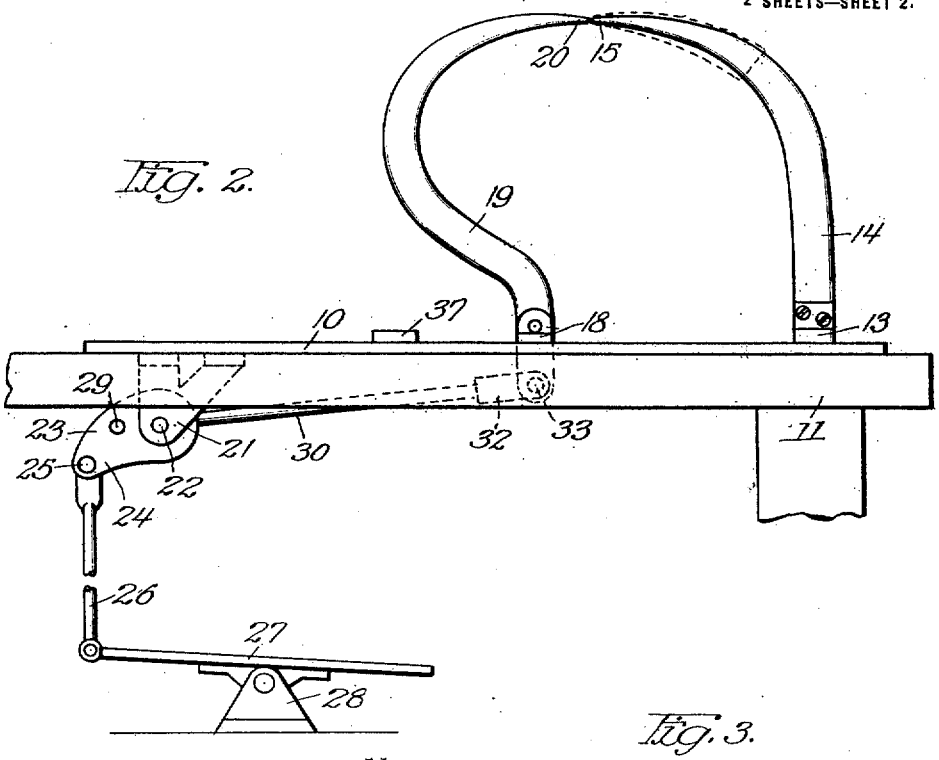
Fig. 2 is a similar view with the parts in operative position.
Figure 3:
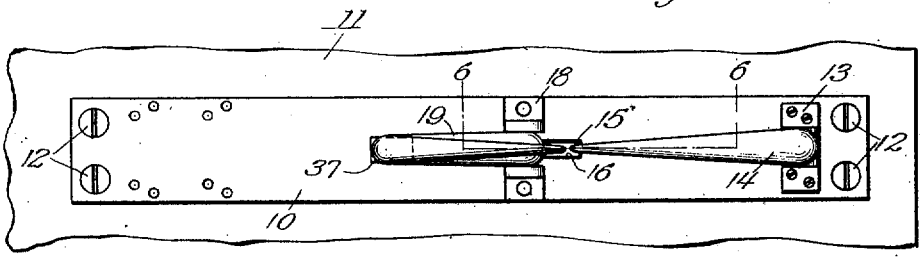
Fig. 3 is a top plan view of the machine.
Figure 6:
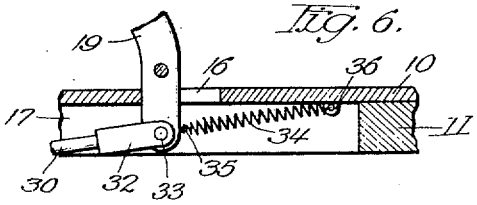
Fig. 6 is a longitudinal section on the line 6—6 of Fig. 3.

At a point a considerable distance from the brackets 13, the base 10 is provided with a longitudinally extending slot or opening 16 registering with a similar opening 17 in the support 11 and having secured to the top thereof on each side of said opening the bearings 18 which have pivotally mounted therebetween the lower end of the adjustable collar supporting member 19. The said lower end of this member extends downwardly through the openings 16 and 17 to a point below the support 11 and the upper portion of said member is also curved in a somewhat similar manner to the member 14 and has its free end tapered to a point as indicated at 20 so that when the members 14 and 19 are in their operative positions, as shown in Fig. 2, the points 15 and 20 will be contiguous to each other for a purpose which will appear in the course of the description.

The base plate 10 has secured to the under side thereof, adjacent the end opposite to that to which the brackets 13 are secured, and depending through the support 11 a pair of brackets 21 connected at their lower ends by a locking pin 22 which provides a pivot for the oppositely disposed plates 23 tapered as indicated at 24 at adjacent ends thereof and connected at said ends by a pin 25 which has pivotally mounted thereon the upper end of a link connection 26 the lower end of which is pivotally connected to one end of a foot treadle 27, pivotally mounted between its ends in brackets 28 and secured to the floor beneath the support 11. The plates 23 are further provided with a pivot pin 29 positioned at a point intermediate the pivots 22 and 25 and having connected thereto one end of an actuating rod 30 provided with a notch 31 adjacent said end adapted to receive therein the pivot pin 25 when the parts are in the position shown in Fig. 2 whereby said rod will be locked in its adjusted position. The other end of the rod 30 is screw threaded and mounted in a coupling 32 pivoted to the lower end of the adjustable collar supporting member 19 as indicated at 33. It will thus be apparent from this description that the member or arm 19 is locked in its adjusted or operative position as shown in Fig. 2.

By depressing the heel end of the treadle 27 the connecting link 26 will be forced upwardly and impart a similar motion to the tapered ends 24 of the plates 23 and thus rock said plates about the pin 22 as a fulcrum whereupon the adjacent end of the rod 30 will be lifted and the notch 31 thereof disengaged from said pin so that said parts will be adjusted to the position shown in Fig. 1. Upon the release of the rod 30 the arm 19 is swung to its inoperative position shown in Fig. 1 by means of a coil spring 34 one end of which is secured to the lower end of said member at 35, while the other end thereof is connected to the under side of the base plate 10 at 36 and in order to cushion the contact between said member 19 and the base plate 10 the latter is provided with a buffer 37. It will be obvious that by depressing the foot treadle 27 in the opposite direction from that described above, the parts will again be returned to the position shown in Fig. 2 against the tension of the spring 34.

In practice, when it is desired to reverse the plies of a section of a collar after certain edges thereof have been stitched, the said section is mounted upon the point 15 of the stationary member 14 with said point located between the two innermost plies and preferably engaged at the corners thereof, as shown in dotted lines. The foot treadle 27 is then operated to swing the member 19 to the position shown in Fig. 2 whereupon the point 20 thereof will enter between the two innermost plies of the collar and will contact or be positioned in very close proximity to the portion of the section of the collar engaged by the point 15, and the member 19 will be locked in this position by engagement of the pin 22 in the notch 31. The point 15 of the member 14 is adapted to be introduced between stitched plies of material and to engage the material and center the stitched seam, so that said seam substantially crosses the axis of the point 15, before the garment has been reversed, and the point 20 of the other arm 19 is adapted to engage the material at a point in alinement with and in opposition to the first mentioned engagement of the material by the point 15 of the arm 14 and define the fold in the material. The operator can thus grasp the plies of the collar section and draw or pull the same over and across the point 20 of said member 19 and in so doing the plies will be reversed and the seam or stitching thereof will then be positioned between the two innermost plies. The foot treadle is then operated oppositely to release the lock and the support 19 is moved away from the support 14 by the spring 34, and is rocked down to bring its point 20 below the plane of the point 15 so as not to interfere with the engagement of a collar with the latter.

What I claim as new and desire to secure by Letters Patent is:

1. A garment turning machine, the combination with a garment supporting member, of a member movable into and out of position to receive the garment from the supporting member and a combined moving, locking and unlocking means operably connected with the movable member.

2. A garment turning machine including a base, a stationary and curved garment supporting arm having one end secured to said base, an adjustable curved garment supporting arm pivoted to said base and having one end arranged in close proximity to the free end of the stationary arm when said adjustable arm is in operative position, and means connected to said adjustable arm for adjusting the same to inoperative position.

3. A garment turning machine including a base, a stationary and curved garment supporting arm having one end secured to said base, an adjustable curved garment supporting arm pivoted to said base and having one end arranged in close proximity to the free end of the stationary arm when said adjustable arm is in operative position, and a spring connected to said adjustable arm for adjusting the same to inoperative position.

4. A garment turning machine including a base, a stationary and curved garment supporting arm having one end secured to said base, an adjustable curved garment supporting arm pivoted to said base and having one end arranged in close proximity to the free end of the stationary arm when said adjustable arm is in operative position, and means for releasably locking said adjustable arm in operative position.

5. In a garment turning machine, the combination with a garment supporting member, of a member movable into and out of position to receive a garment from the supporting member, and means connected with the movable member for initially moving the movable member into position to receive a garment from the supporting member and for locking the movable member in such position subsequent to the movement of the movable means through dead center relative to the resistance of the movable member.

6. A garment turning machine including a stationary garment supporting member upon which a section of the garment is mounted, a pivoted garment supporting member movable toward and away from a portion of the first named supporting member whereby said section of the garment may be drawn over the pivoted supporting member to reverse the same, means including a foot operated treadle for adjusting the pivoted supporting member to operative position, and means for releasably locking said pivoted supporting member in operative position.

7. A garment turning machine including a garment supporting arm, a second garment supporting arm movable toward and away from the first mentioned arm, means for moving the second mentioned arm away from the first mentioned arm, and means for moving the second mentioned arm toward the first mentioned arm and for locking the second mentioned arm against movement by the first mentioned moving means.

8. In a garment turning machine, the combination with a garment supporting member, of a member movable into and out of position to receive a garment from the supporting member, and means connected with the movable member for initially moving the movable member into position to receive a garment from the supporting member and for locking the movable member in such position subsequent to the movement of the movable means through dead center relative to the resistance of the movable member, said means being also constructed and arranged for operation to release the movable member to permit it to be moved out of its locked position.

9. A garment turning machine including a movable garment supporting arm, means for holding the movable arm yieldably against movement in one direction, means for moving the arm against the action of the holding means and for locking it against the action of the holding means, said moving means being also operable to unlock the arm to permit it to be moved by the yieldable holding means.

10. In a garment turning machine, the combination with a movable member, of means shiftable in one direction to initially move the movable member and to subsequently lock the movable member against movement on said means passing dead center relative to the resistance of the movable member, said means being shiftable in the opposite direction to unlock the movable member.

11. A device for turning garments such as collars to impart a thin smooth folded edge thereto, comprising a pair of supporting and turning arms, one of said arms being fashioned to be introduced between stitched plies of material, and reduced to a seam-centering point to engage the material and center the stitched seam before the garment has been reversed, and the other arm comprising a member reduced to a fold-defining point extending, when in operative position, toward the first mentioned point and adapted to engage the material at a point in alinement with and in opposition to said first mentioned engagement thereof, so that the reversing of the garment to remove the same from the first mentioned arm onto the second mentioned arm will effect the formation of a sharp fold contiguous to the seam, thus securing a sharp even turning of the garment.

In witness whereof I hereunto subscribe my name this 27th day of December, 1918.

WILLIAM A. BARNETT.

Witnesses:

A. E. HOWARD,

H. G. SCHWARTZ.